Figure 1:
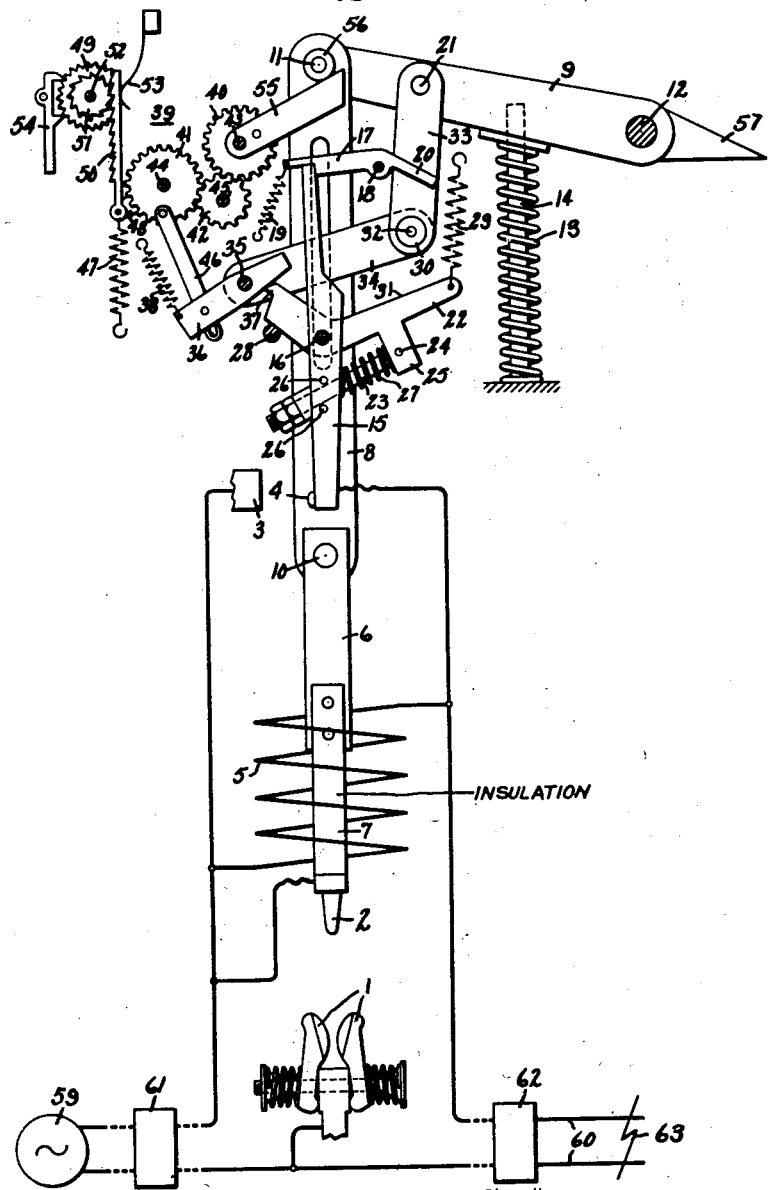

March 15, 1949.  R. R. BUSH  2,464,553
APPARATUS FOR PROTECTING ELECTRIC POWER SYSTEMS
Filed Jan. 4, 1945  3 Sheets-Sheet 1

Inventor:
Ralph R. Bush,
by Harry E. Dunham
His Attorney.

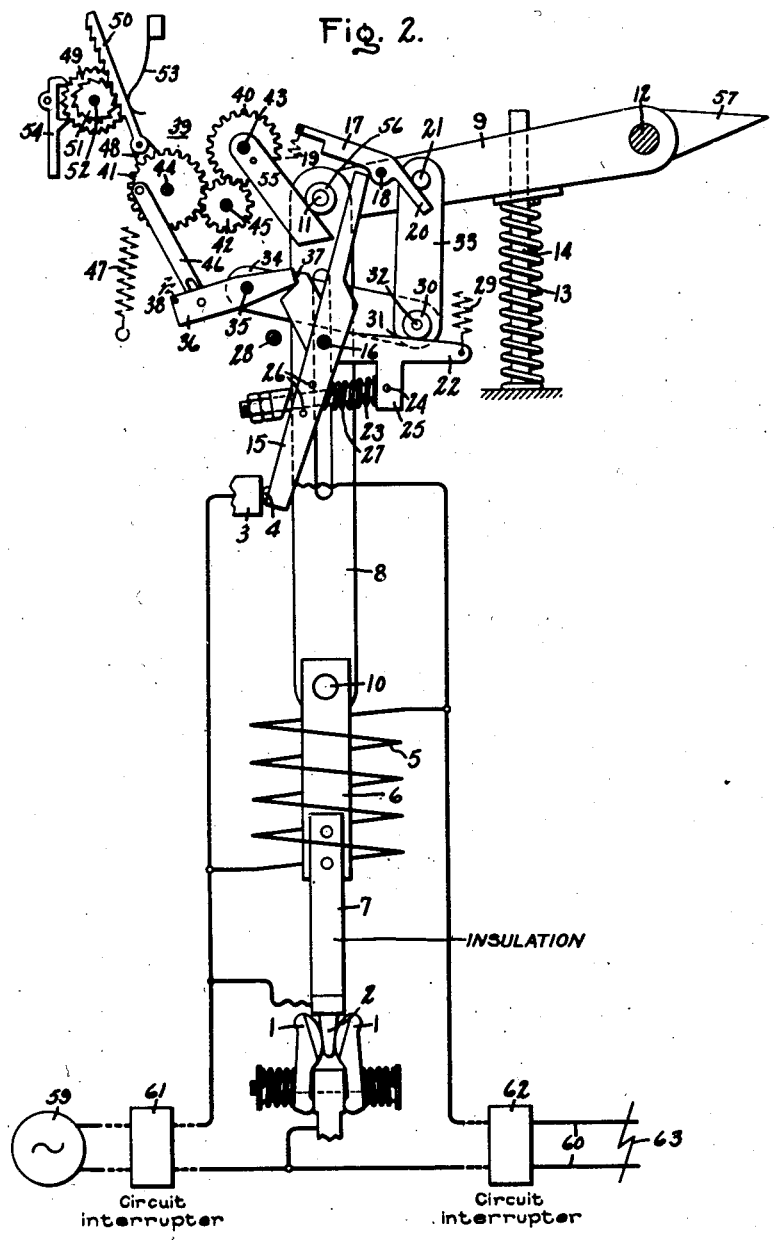

March 15, 1949. R. R. BUSH 2,464,553
APPARATUS FOR PROTECTING ELECTRIC POWER SYSTEMS
Filed Jan. 4, 1945 3 Sheets-Sheet 3

Inventor:
Ralph R. Bush,
by Harry E. Dunham
His Attorney.

Patented Mar. 15, 1949

2,464,553

UNITED STATES PATENT OFFICE 2,464,553

APPARATUS FOR PROTECTING ELECTRIC POWER SYSTEMS

Ralph R. Bush, Upper Darby, Pa., assignor to General Electric Company, a corporation of New York Application January 4, 1945, Serial No. 571,221

13 Claims. (Cl. 175—294)

My invention relates to improvements in apparatus for protecting electric power systems on the occurrence of abnormal circuit conditions and especially faults of a transient character.

Electric storms, winds, broken tree branches and the like frequently cause arcing between the line conductors of electric power systems and also between the line conductors and ground. Although such transient faults may initially involve only one conductor or one phase of a polyphase system, they will, if allowed to continue, frequently spread to more conductors and even develop into faults of a persistent character. At the arcing point, the metal of the conductor is burned. This weakens the conductor often to the breaking point, thereby interrupting the much desired continuity of service on the faulty part of the system. If a line conductor breaks and falls to ground, it constitutes an electrical hazard until such time as fault clearing devices between the break and the power supply or supplies operate. In so doing, continuity of service on the sound part of the system is also interrupted. Even if the conductor does not break, the system circuit interrupting devices, such as circuit breakers, fuses and the like, are apt to open and thus interrupt service.

Arrangements have been proposed for eliminating the troubles consequent upon faults of a transient character. As far as I am aware, these have involved close coordination between a short circuiting device and a circuit breaker between this device and the source or between a short circuiting device and a separate circuit interrupting device at the same location. One other arrangement embodies the use of a specially proportioned inductance, but this serves only to suppress arcs involving one conductor and ground.

An object of my invention is to provide improved protective apparatus for preventing material damage to system conductors and other equipment on the occurrence of faults of a transient character such as short circuits caused by arcs between system conductors or between a system conductor and ground. Another object of my invention is to provide improved protective apparatus which will maintain the maximum continuity of service under faults of transient character and yet insure the necessary isolation of faults of a persistent character. A further object of my invention is to provide an improved variant time sequence switching form of protective apparatus which does not require more than one device for protecting a line conductor and which is self-timing in both sequential closing and opening of its contacts and hence does not have to be coordinated with any circuit breakers between its location and the source. These and other objects of my invention will appear in more detail hereinafter.

In accordance with my invention, I provide an improved electromagnetically operated self-variant timing switch form of protective device which operates quickly on the occurrence of a fault to short circuit the fault on the supply side long enough to insure the extinction of the arc if the fault is of a transient character and then quickly short circuits its operating winding to remove the short circuit across the fault and also establishes a path for the flow of current to the fault for a predetermined time sufficient to effect the operation of isolating or interrupting devices on the system and particularly between the device and the fault if the fault is of a persistent character.

My invention will be better understood from the following description when considered in connection with the accompanying three sheets of drawings, and its scope will be pointed out in the appended claims.

Figure 4:
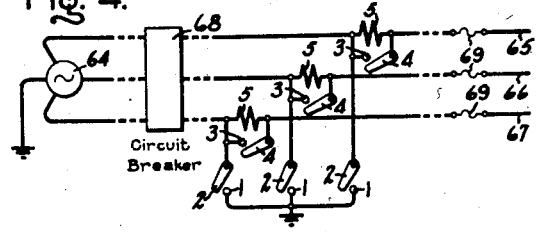
Figure 3:
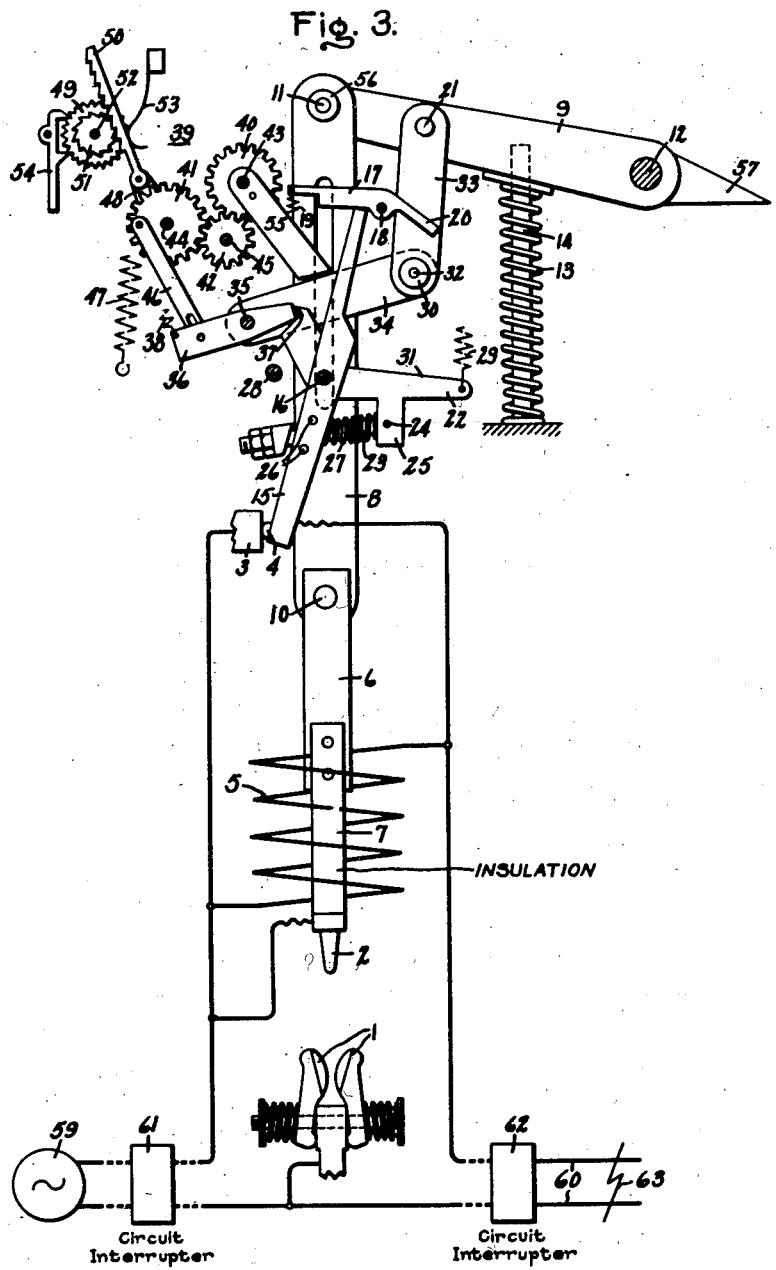

In the accompanying three sheets of drawings, Fig. 1 is a schematic illustration of protective apparatus embodying my invention as applied to a single phase alternating current power system under normal operating conditions; Fig. 2 is an illustration similar to Fig. 1 showing the first operative change of the apparatus immediately following a fault involving the system phase conductors; Fig. 3 is an illustration similar to Fig. 1 showing the next operative change of the apparatus; and Fig. 4 is a diagrammatic illustration showing the application of protective apparatus embodying my invention to a three phase alternating current power system having a grounded neutral.

Referring now to Figs. 1, 2 and 3 of the drawings, I have shown an embodiment of my invention in an electromagnetic switching device comprising two sets of relatively movable cooperating contacts 1, 2 and 3, 4 and means for effecting a closing operation of one set of contacts 1, 2. As shown, this closing means includes an actuating winding such as a solenoid or coil 5 provided with an armature 6 from which the movable contact is suspended by suitable means such as an insulating member 7, all to be suitably guided, as will be apparent to those skilled in the art. For effecting a circuit opening operation of the contacts 1 and 2 when the coil 5 is deenergized, I provide means tending to move the contact 2 upward. As shown, this means comprises a link 8 which is pivotally connected to the armature 6 and to a lever 9 at 10 and 11, respectively. The lever 9 is pivotally supported at 12 and biased for clockwise rotation by suitable means such as a spring 13 under compression. As shown, the spring 13 is mounted on a guide post 14. For normally maintaining the contacts 3, 4 in the circuit open position, I mount the movable contact 4 on a lever 15 which is pivotally supported at 16 and held against clockwise rotation or circuit closing movement by suitable means such as a latch 17 which is pivotally supported at 18. This latch is biased for counterclockwise rotation into latching position by suitable means such as a spring 19 under tension. As illustrated, the link 8 is slotted so that it may move up and down freely relatively to the pivotal support 10.

Also in accordance with my invention, I provide means for quickly closing the contacts 3 and 4 after the closing of the contacts 1 and 2 and while they are still closed. For this purpose, I provide means for releasing the latch 17 and moving the contact lever 15 to the closed circuit position and there holding it. For releasing the latch 17, it is provided with a tail 20 which extends into the path of movement of a projection on the lever 9 such, for example, as a pin 21 so that, during the counterclockwise or closing movement of the lever 9, the latch 17 is turned clockwise against the bias of the spring 19 to the released position shown in Fig. 2.

For moving the switch lever 15 into the circuit closing position with a snap action, as soon as the latch 17 is released, I provide suitable means such as an actuating crank 22 which is pivotally supported at 16 and which is resiliently coupled to the switch lever 15. As shown, this resilient coupling comprises a lost motion link such as a post 23 which is pivoted at 24 to an extension 25 of the crank 22 and which is guided between pins 26 on the switch lever 15. On the post 23 between the switch lever and the arm 25 of the crank 22, there is a spring 27 under slight compression. As shown in Fig. 1, the crank 22 is biased for counterclockwise rotation against a stop 28 by suitable means such as a spring 29 so as thereby to carry the contact operating lever 15 together with contact 4 to the open position in which they are shown in Fig. 1 wherein the latch 17 engages with the upper end of the lever 15.

For rotating the crank 22 clockwise to increase the compression of the spring 27 so as to insure the desired snap action of the switch lever 15 when the latch 17 is released, I provide a roller 30 which is arranged to be actuated by the movement of the lever 9 to engage the crank 22 along its edge 31. To effect this action, the roller 30 is pivotally mounted at the junction 32 of a link 33 and an arm 34 which are respectively pivotally mounted at 21 on the lever 9 and at a stationary point 35. In order to maintain the switch lever 15 in the closed circuit position shown in Fig. 3 after the movement of the lever 9 from the position shown in Fig. 2 to its initial position shown in Fig. 3 and also Fig. 1, I provide suitable means such as a latching member 36 which, as shown, is pivotally supported at 35 and is arranged to engage a suitably notched portion 37 in the portion of the crank 22 to the left of its pivotal support 16. For effecting clockwise rotation of the latching member 36 into the latching position, I provide suitable biasing means such as a spring 38.

For opening the contacts 3, 4 a predetermined time after their closing, I provide a time mechanism 39 which, as shown, is arranged to be energized or set in response to the downward or circuit closing movement of the armature 6. As illustrated, the timing mechanism 39 is of the pawl and ratchet escapement type and is arranged to effect the release of the latching member 36 so that the crank 31 is free to rotate counter clockwise under the bias of its spring 29 and thereby cause the circuit opening movement of the switch lever 15. As illustrated, the timing mechanism 39 comprises a gear train including main gears 40 and 41 and an intermediate gear 42. These gears 40, 41 and 42 are respectively rotatable on axes 43, 44 and 45. The main gear 41 is connected to the latching member 36 by a lost motion link 46 and is biased for counterclockwise rotation by suitable means such as a spring 47 which is attached to a crank 48 rigidly associated with the gear 41. The main gear 41 is coupled to an escapement wheel 49 through an over-running pawl 50 and a ratchet wheel 51 rigidly associated with the escapement wheel 49 so as to rotate therewith on an axis 52. The pawl 50 is held against the ratchet wheel 51 by a suitable biasing means such as a leaf spring 53. The escapement wheel 49 is controlled by a pallet 54. For energizing the timing mechanism 39 during the downward movement of the armature 6, the main gear 40 is provided with a rigidly associated arm 55 which extends into the path of movement of the roller 56 mounted on the pivot 11 at the junction of the lever 9 and the link 8.

In order to obtain a definite sequence in the closing and opening operations of the contacts 1, 2 and 3, 4 in response to a predetermined energization of the coil 5, I so arrange the contacts 3, 4 as effectively to deenergize the coil 5 when the contacts 3, 4 are closed. Thus, as shown in Figs. 1, 2 and 3, the coil 5 is connected across the contacts 3, 4 so as to be short circuited thereby when these contacts close. With this arrangement, it will be apparent that when the coil 5 is energized by current above a predetermined value, the contacts 1, 2 are very quickly closed, preferably in less than one-sixtieth of a second for the application of devices embodying my invention as hereinafter set forth. The contacts 3, 4 close quickly thereafter as the armature 6 finishes its stroke in the closing direction to trip latch 17 during the closure of contacts 1, 2. As soon as the contacts 3, 4 close, the winding 5 is deenergized and the contacts 1, 2 open in a matter of one-tenth to one-half second because of the inertia of the parts and added time delay, if necessary. Subsequently the contacts 3, 4 open in a predetermined time dependent on the setting of the time mechanism 39. Since most of the mechanism herein described will, in general, be mounted in a hollow insulator filled with oil deeply enough to immerse the contacts 3, 4 and the remaining mechanism enclosed by a housing mounted on top of the insulator, it is desirable to be able to determine at a glance whether the contacts 1, 2 are open or closed. For this purpose, the lever 9 may be provided with a pointer extension 57 which moves across a window in the housing, not shown, and, by its up or down position, indicates whether the contacts 1, 2 are closed or open.

The protective apparatus described above is illustrated as applied to the protection of a single phase alternating current power system comprising a source 59. The system conductors are shown in broken line to give a concept of distance. As shown, the source 59 is connected to a load circuit or network 60 through a circuit interrupter 61 and other circuit interrupting means 62 with the coil 5 of the short circuiting device connected in series in the circuit between the interrupters 61 and 62. The contacts 1 and 2 are arranged when closed to short circuit the circuit 60, and the contacts 3 and 4 are arranged when closed to short circuit the coil 5. The circuit interrupters 61 and 62 are not necessary for the operation of apparatus embodying my invention. In practice, however, they are generally found in some form such as a fuse or a circuit breaker and, when used, may be located at any desirable point or points which are in no way dependent on the positioning of apparatus embodying my invention. The circuit interrupter 61, if a circuit breaker, may be arranged for a predetermined cycle of reclosures and lockout, examples of which are well known to the art. On the occurrence of a fault on the load circuit 60, the circuit interrupter 62 should operate with a predetermined time delay before isolating the load. For relatively low voltage distribution systems, 4800 volts for example, fuses are in general satisfactory. Usually other fuses will be in series with the circuit interrupter 62 in the load network, as is well known to the art, and for selectively these fuses will have graded time delays so that the fuse nearest the fault tends to operate first. However, no fuse should operate in a time shorter than that required for apparatus embodying my invention to function to close so that transient faults may be extinguished without service interruption.

Assuming now a fault such as a short circuit across the conductors 60 to occur on the load side of the short circuiter, as indicated at 63, then sufficient current will flow from the source 59 to the fault to cause the coil 5 to move the armature 6 to the circuit closing position and thereby effect the closing of the contacts 1 and 2, as shown in Fig. 2. Immediately upon the closing of these contacts, the fault 63 is short circuited. The contacts 1, 2 remain closed for a period long enough to effect the extinction of an arc, and the fault 63 will be cleared if it is of a transient or arcing character.

In its downward movement, the armature 6 effects the clockwise movement of the actuating crank 31 whereby to compress the spring 27 so that, upon the release of the latch 17 in consequence of the downward movement of the pin 21, the switch lever 15 is caused to move clockwise near the end of the armature stroke thereby to cause the closing of the contacts 3, 4 and the holding of the crank 31 which is engaged by the latch 36. During the downward movement of the roller 56, the arm 55, rigidly associated with the main gear 40 of the timing mechanism 39, is turned clockwise to energize this mechanism. Upon the closing of the contacts 3, 4, the coil 5 is short circuited. The parts are now positioned as shown in Fig. 2 wherein both sets of contacts are closed and the timing device 39 is set.

As soon as the coil 5 is short circuited, the energy stored in the spring 13 during the counterclockwise movement of the lever 9 is available to effect the return movement of the armature 6 whereby the contacts 1 and 2 are opened after a delay in the neighborhood of one-tenth of a second. The parts are now positioned as shown in Fig. 3. Following the upward movement of the roller 56 in consequence of the release of the armature 6, the timing mechanism 39, which was energized during the downward movement of the roller 56, is free to run through its escapement to effect the release of the latch 36 after a predetermined time delay whereby to permit the return of the switch lever 15 to the circuit open position under the bias of the spring 29. The time delay of the timing mechanism 39 should be sufficient to permit the operation of the circuit interrupter 62 in the event that the fault 63 is of a persistent type which the closing of the contacts 1 and 2 cannot clear. At the expiration of the timing period, the parts are returned to the position shown in Fig. 1.

From the foregoing, it will be apparent that in apparatus embodying my invention a fault on the load circuit is so quickly cleared in case of transient or arcing faults that damage to conductors in consequence of burning is reduced to a minimum without any effective interruption of service. On the other hand, if a fault is not of a transient character, current flow is maintained long enough to insure that interrupting devices on the load side of the short circuiter can function to clear a persistent fault. Further, it will be obvious that with short circuiters embodying my invention, there is no absolute necessity for any special circuit interrupting devices between the source 59 and the short circuiter.

In Fig. 4, I have illustrated very diagrammatically the application of short circuiting apparatus embodying my invention to a three phase alternating current system comprising a source 64. As shown, this source has a grounded neutral and is connected to a load circuit comprising conductors 65, 66 and 67 through a circuit breaker 68 and fuses 69. The circuit breaker 68 can be omitted. In each phase conductor between the pole of the circuit breaker 68 and the fuse 69 in the phase conductor in question, there is connected the coil 5 of a short circuiting device embodying my invention. The stationary contacts 1 of the short circuiting devices are connected to a common grounded point, as shown, and the coil 5 of each short circuiter is arranged to be short circuited by its contacts 3 and 4 as heretofore explained.

With this arrangement, it will be apparent that, on the occurrence of a short circuit between any two phase conductors, the short circuiter in each phase will operate to close its contacts 1 and 2 whereby to complete a metallic short circuit to close the faulted phase conductors on the side of the fuses 69 toward the source. In this way, a transient fault embodying two phase conductors will be cleared. If, however, a transient fault involves one phase conductor to ground, then the energization of the winding 5 of the short circuiter in the grounded conductor will close the contacts 1 and 2 of this short circuiter thereby completing a short circuit to ground between the fuse 69 in the grounded conductor and the source. This short circuit will clear the arc-over to ground. The grounding of two different phase conductors substantially simultaneously is in effect a short circuit between the conductors, and the short circuiter in each conductor will operate. If, in any case, the fault is of a persistent character, the short circuiters which operate will close their contacts 3 and 4 to restore full current flow to the faulted conductor or conductors whereby to effect the operation of the fuses 69 in the faulted conductor or conductors.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:

1. An electromagnetic switching device comprising an armature, two sets of relatively movable cooperating contacts, separate biasing means for opening each set of contacts, an energizing winding connected across one of said sets of contacts, means for effecting a closing operation of the other set of contacts when said winding is energized by current sufficient to effect the movement of the armature to the attracted position, predominant biasing means in which energy is stored during movement of the armature to the attracted position for effecting the closing operation of said one set of contacts, latching means controlled by the movement of said armature to the attracted position for quickly releasing said one set of contacts to shunt and thereby deenergize said winding upon the closing of said other set of contacts, and time delay latching means arranged to be set during the movement of the armature to the attracted position for maintaining said predominant biasing means effective to prevent the opening of said one set of contacts for a predetermined time after their closing.

2. For the protection of an electric power system wherein a source of electromotive force is connected to a circuit through circuit interrupting means; electromagnetic switching means comprising an actuating winding for connection in series relation in said circuit, a first contact means adapted to be closed to short circuit said circuit, a second contact means operative when closed to short circuit said winding, means including said winding for substantially instantaneously closing said first contact means on the occurrence of an abnormal condition of said circuit and substantially immediately thereafter closing said second contact means, means for re-opening said first contact means after a predetermined time sufficient for a transient abnormal circuit condition to clear, and means for re-opening said second contact means after a time sufficient for said interrupting means to clear a nontransient abnormal circuit condition.

3. For the protection of an electric power system wherein a source of electromotive force is connected to a circuit; electromagnetic switching means comprising an actuating winding for connection in series relation in said circuit, a first contact means adapted to be closed to short circuit said circuit, a second contact means operative when closed to short circuit said winding, means including said winding for substantially instantaneously closing said first contact means on the occurrence of an abnormal condition of said circuit and substantially immediately thereafter closing said second contact means, means for re-opening said first contact means after a predetermined time sufficient for a transient abnormal circuit condition to clear, and means for re-opening said second contact means after a different predetermined time.

4. For the protection of an electric power system wherein a source of electromotive force is connected to a circuit; electromagnetic switching means comprising an actuating winding for connection in series relation in said circuit, a first contact means adapted to be closed to short circuit said circuit, a second contact means operative when closed to short circuit said winding, means including said winding for substantially instantaneously closing said first contact means on the occurrence of an abnormal condition of said circuit and thereafter quickly closing said second contact means, means for subsequently re-opening said first contact means after a predetermined time, and means for reopening said second contact means after a greater predetermined time.

5. For the protection of an electric power system wherein a source of electromotive force is connected to a load circuit through an automatic reclosing circuit breaker in series relation with a time delay fault isolating means; electromagnetic switching means comprising an actuating winding for connection in series relation in said circuit between said circuit breaker and said fault isolating means, a first contact means adapted to be closed substantially instantaneously by said actuating winding on the occurrence of an abnormal condition on said circuit to short circuit the circuit between the circuit breaker and the fault, a second contact means closed by said actuating winding immediately following the closing of said first contact means and arranged when closed to short circuit said winding, means for re-opening said first contact means after a predetermined time sufficient for a transient abnormal circuit condition to clear itself, and means for reopening said second contact means after a time sufficient for said circuit breaker or said fault isolating means to clear a nontransient abnormal condition.

6. An electromagnetic switching device comprising two sets of relatively movable cooperating contacts, means including an electromagnet energizable for effecting a closing operation of one of said sets of contacts, means tending to effect the opening operation of said one set of contacts upon deenergization of said electromagnet, means including a latch mechanism released by said electromagnet upon energization thereof for closing said other set of contacts while the said one set of contacts is still closed, and means including a second latch mechanism having a time delay trip device set into operation upon deenergization of said electromagnet for effecting the opening of said other set of contacts a predetermined time thereafter.

7. An electromagnetic switching device comprising two sets of relatively movable cooperating contacts, means including a magnetic armature attractable for effecting a closing operation of one of said sets of contacts and having an attractive winding connected across the other set of contacts, biasing means tending to effect the opening operation of said one set of contacts upon release of said armature, means including a latch mechanism released upon attraction of said armature for closing said other set of contacts while the said one set of contacts is still closed, and means including a second latch mechanism having a time delay trip device set into operation upon release of said armature for effecting the opening of said other set of contacts a predetermined time thereafter.

8. For the protection of an electric power system wherein a source of electromotive force is connected to a circuit through circuit interrupting means; electromagnetic switching means comprising an actuating winding for connection in series relation in said circuit, a first contact means adapted to be closed to short circuit said circuit, a second contact means operative when closed to short circuit said winding, means including said winding for substantially instantaneously closing said first contact means on the occurrence of an abnormal condition of said circuit and for closing said second contact means while the first contact means is still closed, means for re-opening said first contact means after a predetermined time sufficient for a transient abnormal circuit condition to clear, and means for re-opening said second contact means after a time sufficient for said interrupting means to clear a nontransient abnormal circuit condition.

9. For the protection of an electric power system wherein a source of electromotive force is connected to a circuit; electromagnetic switching means comprising an actuating winding for connection in series relation in said circuit, a first contact means adapted to be closed to short circuit said circuit, a second contact means operative when closed to short circuit said winding, means including said winding for substantially instantaneously closing said first contact means on the occurrence of an abnormal condition of said circuit and for closing said second contact means while the first contact means is still closed, means for re-opening said first contact means after a predetermined time sufficient for a transient abnormal circuit condition to clear, and means for re-opening said second contact means after a different predetermined time.

10. For the protection of an electric power system wherein a source of electromotive force is connected to a circuit; electromagnetic switching means comprising an actuating winding for connection in series relation in said circuit, a first contact means adapted to be closed to short circuit said circuit, a second contact means operative when closed to short circuit said winding, means including said winding for substantially instantaneously closing said first contact means on the occurrence of an abnormal condition of said circuit and for closing said second contact means while the first contact means is still closed, means for subsequently re-opening said first contact means after a predetermined time, and means for re-opening said second contact means after a greater predetermined time.

11. A variant time sequence switching device comprising two sets of separately operable contacts having sequential closing mechanism provided with an operating winding for effecting closure of one of said sets of contacts upon a predetermined energization of said winding, biasing means for opening said one set of contacts upon the deenergization of said winding, said mechanism having mechanical connections for closing the other set of contacts during the closure of said one set of contacts and said other set of contacts having electrical connections for deenergizing said winding upon closure thereof, separate biasing means for opening said other set of contacts, and time delay holding means having operating means rendered effective upon each energization of said winding for maintaining said other set of contacts closed for a substantial time interval after the deenergization of said winding.

12. A variant time sequence switching device comprising two separately operable sets of contacts having sequential closing mechanism provided with an operating winding connected across the last set of contacts to close to be deenergized thereby, separate biasing means for opening each set of contacts when said winding is deenergized, said mechanism having snap action means for closing said last set of contacts to deenergize said winding upon the closing of the first set of contacts to cause the corresponding biasing means to effect an immediate opening of said first set of contacts after their closure, and time delay holding means for delaying the opening of said last set of contacts a predetermined time after the deenergization of said winding.

13. A variant time sequence switching device comprising two separately operable sets of contacts having sequential closing mechanism provided with an operating armature, means including a winding for attracting said armature to close one of said sets of contacts upon a predetermined energization of said winding, separate biasing means for opening each set of contacts when said armature is unattracted, said closing mechanism having a snap action latch mechanism for quickly closing the other set of contacts after the closing of said one set of contacts and said other set of contacts having connections for short-circuiting said winding to release the armature upon closure thereof, and latch mechanism for holding the other set of contacts closed having a time delay trip mechanism rendered effective upon movement of the armature to the attracted position for effecting the release of the other set of contacts a predetermined time after their closing.

RALPH R. BUSH.

REFERENCES CITED

The following references are of record in the file of this patent:

UNITED STATES PATENTS

| Number | Name | Date |
| --- | --- | --- |
| 904,906 | Wiegand | Nov. 24, 1908 |
| 2,069,162 | Hailes | Jan. 26, 1937 |
| 2,288,953 | Mathews | July 7, 1942 |
| 2,339,025 | Mathews | Jan. 11, 1944 |
| 2,352,556 | Mathews | June 26, 1944 |